(12) United States Patent
Bellanger et al.

(10) Patent No.: US 9,010,681 B2
(45) Date of Patent: Apr. 21, 2015

(54) NACELLE FOR AN AIRCRAFT ENGINE

(71) Applicant: Aircelle, Gonfreville l'Orcher (FR)

(72) Inventors: Alexandre Bellanger, Le Havre (FR); Florent Bouillon, Anglesqueville l'Esneval (FR); Laurent Dubois, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/662,905

(22) Filed: Oct. 29, 2012

(65) Prior Publication Data

US 2013/0062462 A1  Mar. 14, 2013

Related U.S. Application Data

(63) Continuation of application No. PCT/FR2011/050505, filed on Mar. 14, 2011.

(30) Foreign Application Priority Data

Apr. 29, 2010 (FR) .................................... 10 53338

(51) Int. Cl.
*B64D 29/06* (2006.01)

(52) U.S. Cl.
CPC ...................................... *B64D 29/06* (2013.01)

(58) Field of Classification Search
USPC ...................................... 244/117 R, 54, 129.1
See application file for complete search history.

(56) References Cited

U.S. PATENT DOCUMENTS

| 5,239,822 | A | 8/1993 | Buchacher |
| 6,935,591 | B2 * | 8/2005 | Udall .............................. 244/54 |
| 2011/0062279 | A1 * | 3/2011 | Welch et al. .................... 244/54 |
| 2012/0097761 | A1 * | 4/2012 | Vache et al. ............. 239/265.19 |
| 2012/0248284 | A1 * | 10/2012 | Bellanger et al. ............. 248/554 |
| 2012/0256051 | A1 * | 10/2012 | Bellanger et al. ......... 244/110 B |

FOREIGN PATENT DOCUMENTS

| FR | 2920133 | 2/2009 |
| FR | 2920140 | 2/2009 |

OTHER PUBLICATIONS

PCT/FR2011/050505 International Search Report, Oct. 30, 2012.

* cited by examiner

*Primary Examiner* — Troy Chambers
*Assistant Examiner* — Jamie S Stehle
(74) *Attorney, Agent, or Firm* — Brinks Gilson & Lione

(57) ABSTRACT

A supporting half-structure for an aircraft engine nacelle is provided that includes at least one longitudinal beam and a front half-frame, the beam and the half-frame being formed of composite materials. The half frame has an open section, and the half-structure defines a structure selected from the group consisting of: the beam and the front half-frame form a one-piece part; the beam has an extension with an open section, the shape of which matches that of the front half-frame, the extension being attached to the half frame; and the front half-frame has an extension with an open shape, the shape of which matches the beam, wherein the extension is attached to the beam.

7 Claims, 3 Drawing Sheets

NACELLE FOR AN AIRCRAFT ENGINE

CROSS-REFERENCE TO RELATED APPLICATIONS

This application is a continuation of International Application No. PCT/FR2011/050505 filed on Mar. 14, 2011, which claims the benefit of FR 10/53338, filed on Apr. 29, 2010. The disclosures of the above applications are incorporated herein by reference.

FIELD

The present disclosure relates to the field of nacelles for aircraft engines.

BACKGROUND

The statements in this section merely provide background information related to the present disclosure and may not constitute prior art.

As this is known per se, an aircraft engine, which is generally of the turbine engine type, is placed inside a nacelle which, among other functions:
ensures aerodynamic fairing of the engine,
allows channeling of the outside air towards the engine,
allows the engine to be connected to the aircraft.

Conventionally, the connection of the engine to the aircraft is made by means of a supporting structure comprising two upper longitudinal beams, conventionally called 12 o'clock beams because of their position at the top of the nacelle, two lower longitudinal beams, conventionally called 6 o'clock beams because of their position in the lower portion of the nacelle, and an assembly having a substantially annular shape called a front frame, in reality formed with two front half-frames each extending between said upper and longitudinal beams, and intended to be attached to the periphery of the downstream edge of the fan case of the engine.

Figure 1:
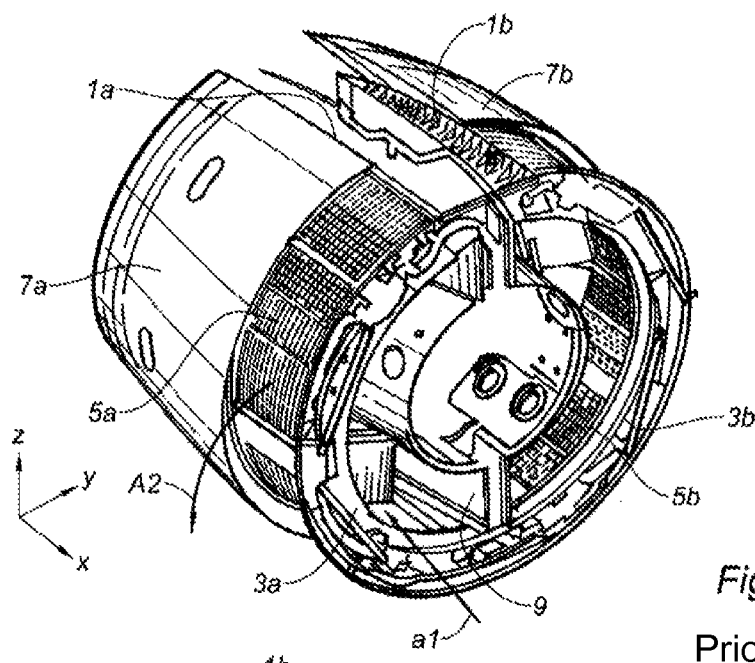

Such a standard configuration is visible in FIG. 1 appended herein, wherein a rear nacelle portion has been illustrated, incorporating in this case a thrust reverser, this rear portion comprising,
two 12 o'clock beams 1a, 1b,
two front half-frames 3a, 3b respectively connected to 12 o'clock beams 1a, 1b and supporting deflecting grids 5a, 5b,
two half-cowls 7a, 7b each slideably mounted on a 12 o'clock beam 1a, 1b respectively so as to be able to expose the deflection grids 5a, 5b with view to achieving thrust reversal (6 o'clock beams not being visible in FIG. 1).

As this is known per se, during thrust reversal, the air A1 from the fan (not shown) and circulating inside the secondary flow vein 9, flows through the grids 5a, 5b and is discharged towards the front of the nacelle, as indicated by the arrow A2.

Figure 2:
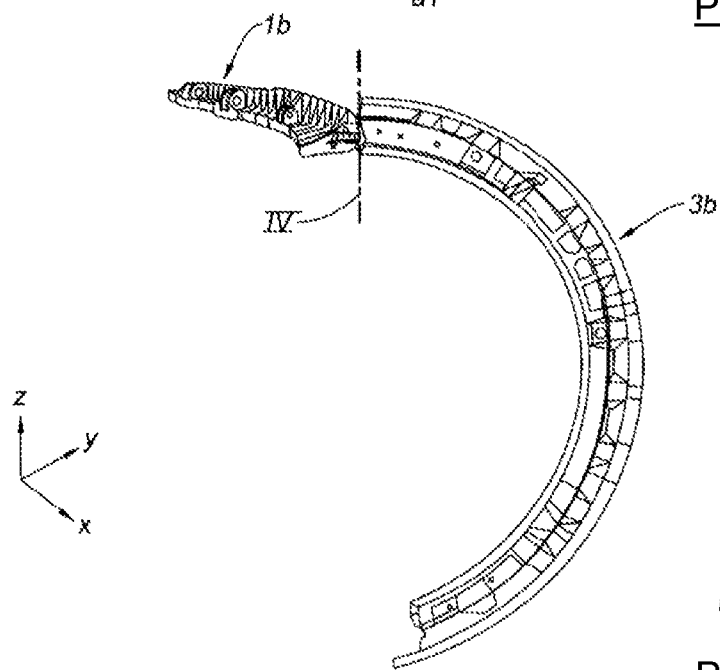

The left 12 o'clock beam 1a and its associated left front half-frame 3a are illustrated individually in FIG. 2 in the assembled condition, and in FIG. 3 just before their assembly.

As this may be seen in FIG. 3, this assembly is conventionally made by providing an extension 11 on the beam 1b, which will fit inside a cavity 13 with a matching shape defined by the wall 15 of the front half-frame 3b.

Figure 4:
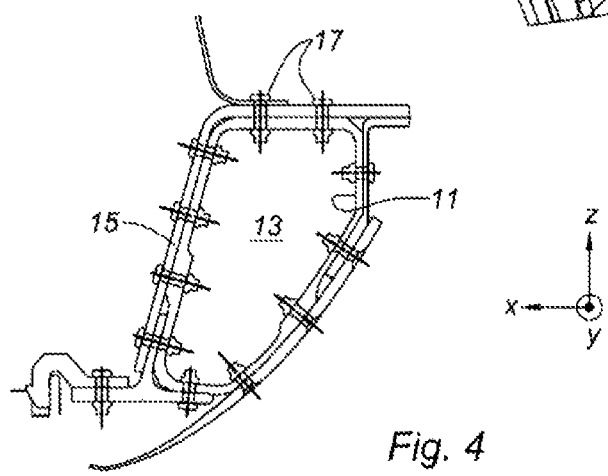

Once this fitting is achieved, rivets 17 will be attached in order to secure the extension 11 of the beam 1a with the wall 15 of the front half-frame 3b (see FIG. 4).

Such an assembling method is not entirely satisfactory, on the one hand because it only allows transmission of the forces on a portion of its section and on the other hand because the rivets are blindly mounted (i.e. they are only accessible from the outside), which makes their mounting and their inspection complicated.

Such an assembly also requires a very long shimming and therefore costly operation (machining of sometimes beveled shims).

SUMMARY

The present disclosure improves the capability of transmitting forces of the connection between each 12 o'clock beam and its associated front half-frame, and to get rid of the drawbacks related to the blind nature of the mounting of the rivets for securing both of these members.

The question is also to reduce the number of rivets, and to simplify, or even cancel out the shimming.

This is achieved with a supporting half-structure for an aircraft engine nacelle, comprising at least one longitudinal beam and a front half-frame, remarkable in that said beam and said half-frame are formed with composite materials, in that said half frame has an open section and in that this half-structure has one of the following features:
said beam and said front half-frame form a one-piece part, or
said beam has an extension with an open section, the shape of which matches that of said front half-frame, this extension being attached to this half-frame, or
said front half-frame has an extension with an open shape, the shape of which matches that of said beam, this extension being attached to this beam.

The open section of the half frame and, if necessary that of the extension of the beam or of the front half frame, give the possibility of applying each of these two solutions and of getting rid of the aforementioned problems.

Indeed, the one piece part is made in a single molding operation (according to known methods of the RTM (Resin Transfer Molding) type or by infusion, for example.

By means of such a one piece part, continuity of fibers of the composite materials is obtained between the beam and its associated front half frame: in this way optimum transmission of the forces is obtained between both of these members.

By placing the fibers in an optimized way (in the direction of the transmission of the forces), a gain in mass is obtained with respect to an aluminum block.

Further, in the case of such a one-piece part, no attachment means between the members is of course necessary, which gives the possibility of getting rid of the aforementioned mounting and control problems.

As to the solution for attaching the extension of the beam onto its associated front half frame, because of the matching open shapes, of this extension and of this half frame, the difficulties for mounting and controlling the means for attaching both of these parts to each other, are suppressed.

The same applies in the alternative where the front half-frame has an extension which is attached on the beam.

The invention further gives the possibility of moving the junction between the beam and its associated front half frame away from the highly loaded transition area between the 12 o'clock warp (substantially vertical) of the beam with its front half frame, by lengthening the extension of the beam (or of the front half frame, according to the relevant alternative).

It is difficult to lengthen this extension so as to make it cost-effective in terms of the costs when a beam is machined in an aluminum block because of the required material. On the other hand, in composite materials, this length is much more easily adjustable.

It will further be noted that by providing a junction between two parts in composite materials, it is possible to get rid of the stresses related to thermal expansion which appear in the case of an assembly between a metal part and a composite part. This results in a gain in studying time and in mass.

Members with open sections as indicated above, can only be easily made with composite materials, when moreover considering the weight and size constraints.

According to other optional features of the half-structure according to the present disclosure:
  said beam is a 12 o'clock beam;
  said beam is a 6 o'clock beam;
  said open sections substantially have the shape of a C;
  said extension is attached on said front half frame by means selected from the group comprising adhesive bonding and attachment with rivets;
  the lower portions of said beam and of the front half frame are faired so as to suppress the gap between these parts, and to thereby ensure aerodynamic continuity.

The present disclosure also relates to a nacelle for an aircraft engine, remarkable in that it comprises two half structures in accordance with the foregoing.

DRAWINGS

Figure 3A:
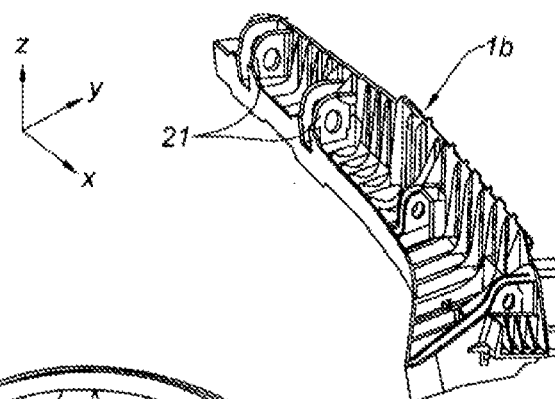
Figure 3B:
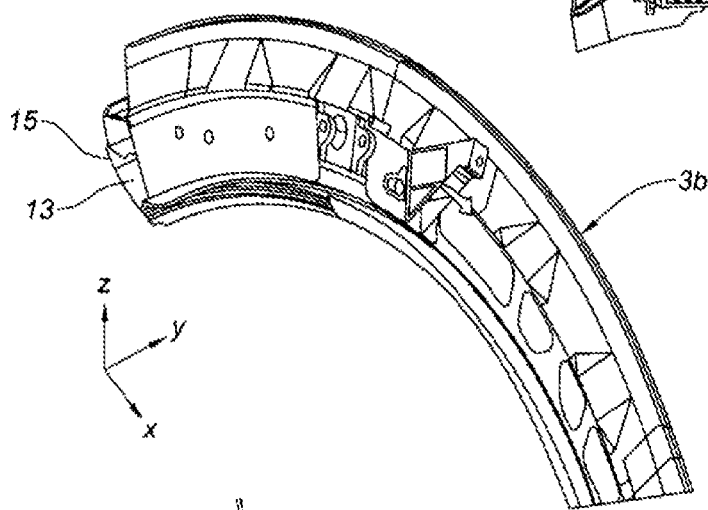
Figure 5:
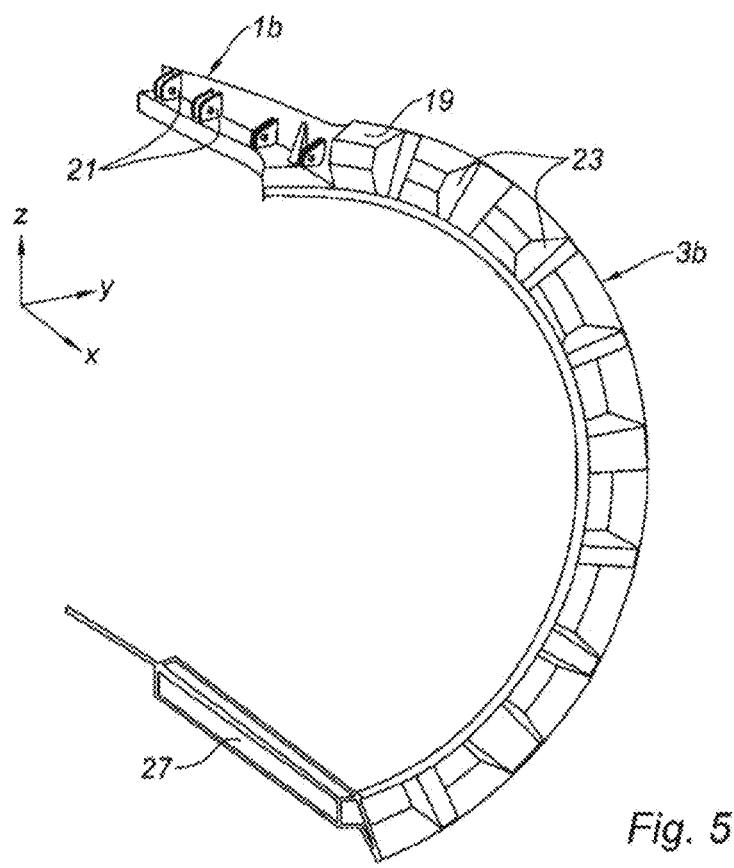
Figure 6A:
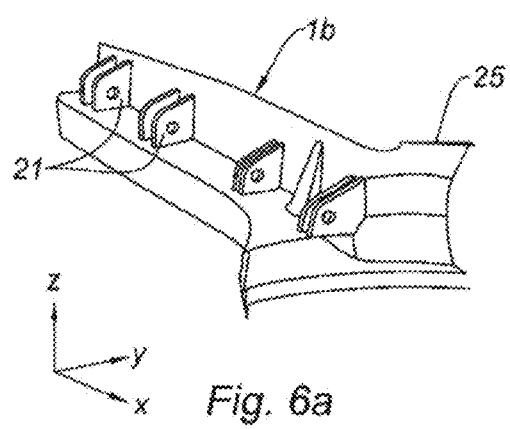
Figure 6B:
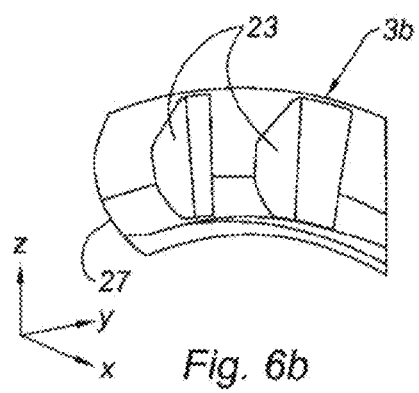

Other features and advantages of the present invention will become apparent in the light of the description which follows, and upon examining the figures appended herein, wherein:

FIG. 1 illustrates a perspective view of a rear nacelle portion from the prior art, including a thrust reversal system, and described in the preamble of the present description, FIG. 2 illustrates as a perspective view and at a slightly larger scale, a left half structure of the assembly illustrated in FIG. 1, this half structure including a 12 o'clock beam and a front half frame, FIG. 3a illustrates as a perspective view and at a still larger scale, the 12 o'clock beam of the half structure of FIG. 2, FIG. 3b illustrates as a perspective view at the same scale as in FIG. 3a, the front half frame of the half-structure of FIG. 2, FIG. 4 illustrates a sectional view along a plane parallel to the plane XZ of FIG. 2, of the area indicated by the line IV of this FIG. 2, FIG. 5 is a perspective view similar to the one of FIG. 2, but at a slightly larger scale, of a left half structure according to the present disclosure, in accordance with a first embodiment; in this figure are visible not only the 12 o'clock beam, but also the 6 o'clock beam, FIG. 6a, similar to FIG. 3a, illustrates a 12 o'clock beam of a left half-structure according to the present disclosure in accordance with a second embodiment, and FIG. 6b, similar to FIG. 3b, illustrates a portion of a left front half-frame of this left half-structure according to the present disclosure in accordance with the second embodiment.

On the whole of these figures, identical or similar references designate identical or similar members or assembly of members.

It will be noted that a reference system XYZ is represented on all the figures, these three axes represent the longitudinal, transverse and vertical directions of the illustrated members or assembly of members, respectively, in the position which they are intended to occupy when they are placed in a nacelle attached on an aircraft.

It should be noted that the arrow of the X axis is oriented from the downstream portion to the upstream portion of the nacelle, downstream and upstream being understood relatively to the direction of circulation of the air inside this nacelle, as this is indicated by the arrow A1 of FIG. 1.

The drawings described herein are for illustration purposes only and are not intended to limit the scope of the present disclosure in any way

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1 to 4 relate to elements of the prior art, described in detail in the preamble of the present description: these elements will therefore not be described again here.

Reference is now made to FIG. 5, wherein it may be seen that according to a first embodiment, the left half-structure according to the invention comprises a left 12 o'clock beam 1b and a left front half-frame 3b formed in one piece.

More particularly, the left 12 o'clock beam 1b has a general substantially L-shaped section, and the left front half-frame 3b has an open general substantially C shaped section.

By «open», it is meant that the volume defined by the wall of the left front half frame 3b is an open trough or gutter volume, and not a closed volume like a box, unlike what is visible in FIG. 4 relating to the prior art.

A transition area 19, formed with one single piece with the left 12 o'clock beam 1b and with the front half-frame 3b, allows passing from the L section of the latter to the C section of the former.

Of course, elsewhere than in the transition area 19, the beam 1b and the front half frame 3b may have sections with different shapes.

In particular, outside the transition area 19, the beam 1b may for example have a box shaped section, or further an omega shaped section.

It should also be noted that the present disclosure also proposes ensuring continuity of the aerodynamic fairings integrated under the beam 1b and in the radially lower portion of the front half-frame 3b in the case when they would be integrated thereto. In particular, with this, it is possible to reduce the aerodynamic losses by suppressing the gap between these paths and between the rivets which bind them.

Hinges 21 are provided in the recess of the L of the beam 1b, allowing placement of rods connecting with the associated right 12 o'clock beam.

Moreover, ribs forming a reinforcement 23 are regularly positioned in the recess of the front half-frame 3b, so as to give the latter the required strength and rigidity.

Taking into account the size and weight constraints to be observed, it is desired to resort to composite materials for making the half-structure illustrated in FIG. 5.

These composite materials may notably comprise carbon fiber fabrics embedded in polymerized resin, among other material forms.

Obtaining this half structure with such composite materials may be achieved i.e. by molding and baking fabrics pre-impregnated with resin, among other manufacturing methods.

Alternatively, the composite materials may be obtained by methods of the LCM (Liquid Composite Molding) type, notably grouping the RTM (Resin Transfer Molding) methods and LRI (Liquid Resin Infusion) methods. The dry preform may be obtained by 2D or 3D weaving, by braiding, by automatically depositing fibers (for example webs), or further by stacking fabrics.

It will be noted that the L and C open sections of the beam 1b and of the front half frame 3b respectively in their transition area 19 considerably simplifies the tools to be applied.

As this may be understood, by making these parts in one piece, it is possible to obtain continuity of the fibers of the composite materials notably in the transition area 19, which is an area subject to very large notably circumferential forces.

A half-structure is obtained in this way, having excellent resistance against these forces, without any attachment means such as rivets, unlike the state of the art (see FIG. 4).

A weight gain is thereby achieved and one reduces problems of the prior art related to the complexity of the placement and of the control of the attachment means in an area of the nacelle which is moreover highly congested.

In a second form, visible in FIGS. 6a and 6b, the left front beam 1b and front half frame 3b form two distinct parts in composite materials, each obtained according to a manufacturing method similar to the one which was described for the form of FIG. 5.

The left 12 o'clock beam 1b includes a transverse extension 25 (i.e. substantially parallel to the plane YZ), having an open section with a shape similar to the open section of the front half frame 3b.

This extension 25 may thus be superposed in a matching way on the associated end 27 of the front half frame 3b.

In order to obtain the whole of a left front structure, the extension 25 of the beam 1b will be attached on the matching end 27 of the front half-frame 3b, by any suitable means, such as for example by adhesive bonding or by placing rivets.

It will be understood that because of the matching of the shapes of the beam 1b and of the front half-frame 3b in the transition area 19, it is possible to obtain improved transmission of the forces and thereby improved strength of the assembly.

It should be noted that the open shapes of the extension 25 and of the portion 27 of the front half frame in the case of placement of rivets, allows the latter to be mounted easily and perfectly visibly, unlike the box-shaped closed layout of the prior art visible in FIG. 4.

Of course, the present invention is by no means limited to the described and illustrated embodiments, provided as simple examples.

This is how in particular the precepts described concerning the connection between the 12 o'clock beam and the front frame may be transposed to a connection between this front frame and the 6 o'clock beam 27, visible in FIG. 5.

What is claimed is:

1. A supporting half-structure for an aircraft engine nacelle comprising at least one longitudinal beam and a front half-frame formed of composite materials, wherein said at least one longitudinal beam extends along a longitudinal direction of the aircraft engine nacelle and, wherein a wall of the front half-frame forms an unclosed cross section thereof such that an open portion of the unclosed cross section provides access to an inner surface of the front half-frame from outside of the front half-frame; and wherein the supporting half-structure defines a structure selected from the group consisting of:
said at least one longitudinal beam and said front half-frame forming a transition part where a cross sectional shape of an end of said longitudinal beam transforms to a cross sectional shape of an end of the front half-frame such that said longitudinal beam and the front half-frame form a single piece;
said at least one longitudinal beam defines an extension which forms a profile having at least one open segment, wherein a cross sectional shape of said extension matches that of said front half-frame, the extension being attached to the front half-frame; and
said front half-frame defines an extension which forms a profile having at least one open segment, wherein a cross sectional shape of said extension matches a cross sectional shape of an end of said at least one longitudinal beam, the extension being attached to the at least one longitudinal beam.

2. The supporting half-structure according to claim 1, wherein said at least one longitudinal beam is a 12 o'clock beam.

3. The supporting half-structure according to claim 1, wherein said at least one longitudinal beam is a 6 o'clock beam.

4. The supporting half-structure according to claim 1, wherein the unclosed cross section has a shape of a C.

5. The supporting half-structure according to claim 1, wherein said extension is attached onto said front half-frame by means selected from the group consisting of adhesive bonding and attachment with rivets.

6. The supporting half-structure according to claim 1, wherein lower portions of said at least one longitudinal beam and of the front half-frame are faired so as to reduce a gap therebetween and to thereby improve aerodynamic continuity.

7. A nacelle for an aircraft engine, wherein the nacelle comprises two supporting half structures according to claim 1.

\* \* \* \* \*